United States Patent [19]

Margulies

[11] Patent Number: 5,739,756
[45] Date of Patent: Apr. 14, 1998

[54] CARBON MONOXIDE DETECTION SYSTEM FOR MOTOR VEHICLES

[76] Inventor: Stuart Margulies, 523 Springhill Dr., Harleysville, Pa. 19438

[21] Appl. No.: 787,955

[22] Filed: Jan. 23, 1997

[51] Int. Cl.⁶ .................................................. G08B 17/10
[52] U.S. Cl. ........................ 340/632; 340/438; 340/693
[58] Field of Search ............................ 340/632, 438, 340/628, 693, 691; 454/137, 162

[56]         References Cited

U.S. PATENT DOCUMENTS

| | | | |
|---|---|---|---|
| 3,772,644 | 11/1973 | Hanselmann et al. | 340/438 |
| 3,786,462 | 1/1974 | Hayden | 340/237 R |
| 4,345,242 | 8/1982 | Ienna-Balistreri | 340/634 |
| 5,120,271 | 6/1992 | Shtanko | 454/137 |
| 5,339,072 | 8/1994 | Agata | 340/693 |
| 5,379,026 | 1/1995 | Whittle | 340/632 |
| 5,541,579 | 7/1996 | Kiernan | 340/693 |

*Primary Examiner*—Thomas Mullen
*Assistant Examiner*—Anh La

[57]         ABSTRACT

A new carbon monoxide detector for motor vehicles for detecting dangerous levels of carbon monoxide within the passenger areas of motor vehicles. The inventive device includes a carbon monoxide detector mounted at the highest point within a passenger compartment of the vehicle, a visual indicating signal to visually signal a warning when dangerous levels of carbon monoxide are detected, and an audible signaling device to provide an audible signal when dangerous levels are detected.

8 Claims, 3 Drawing Sheets

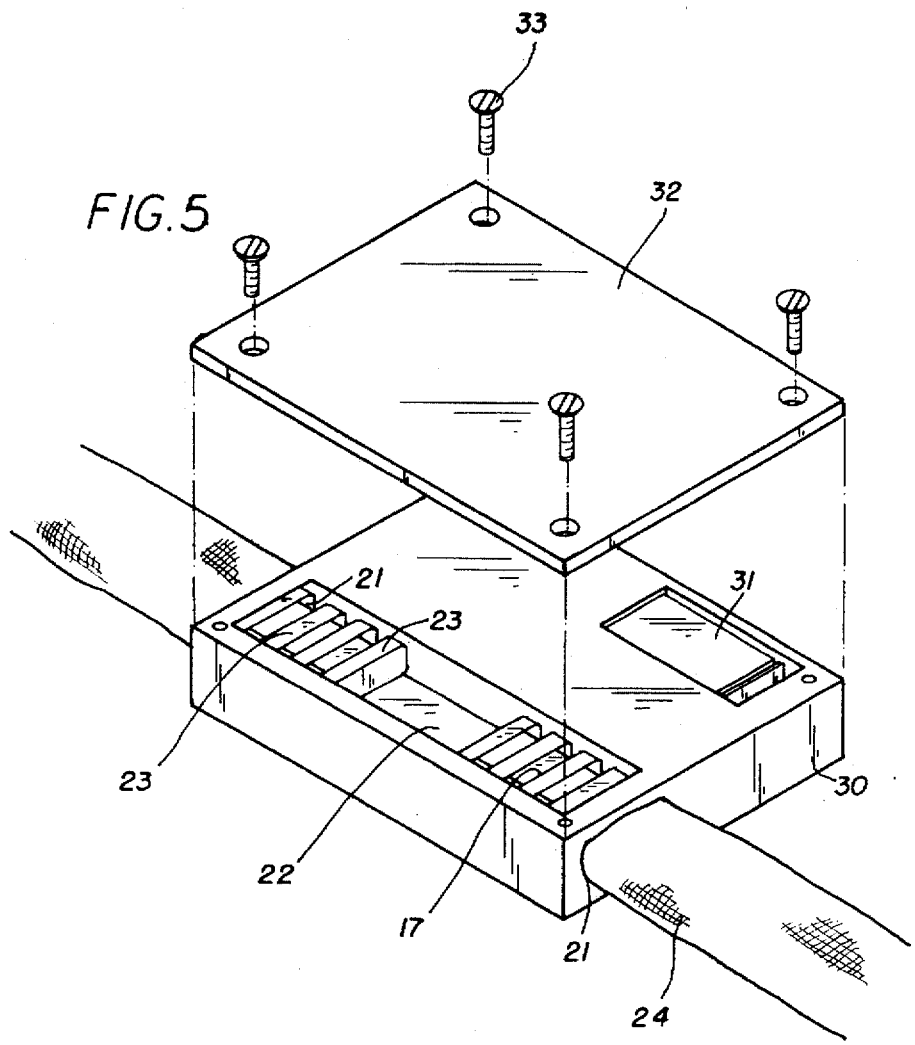
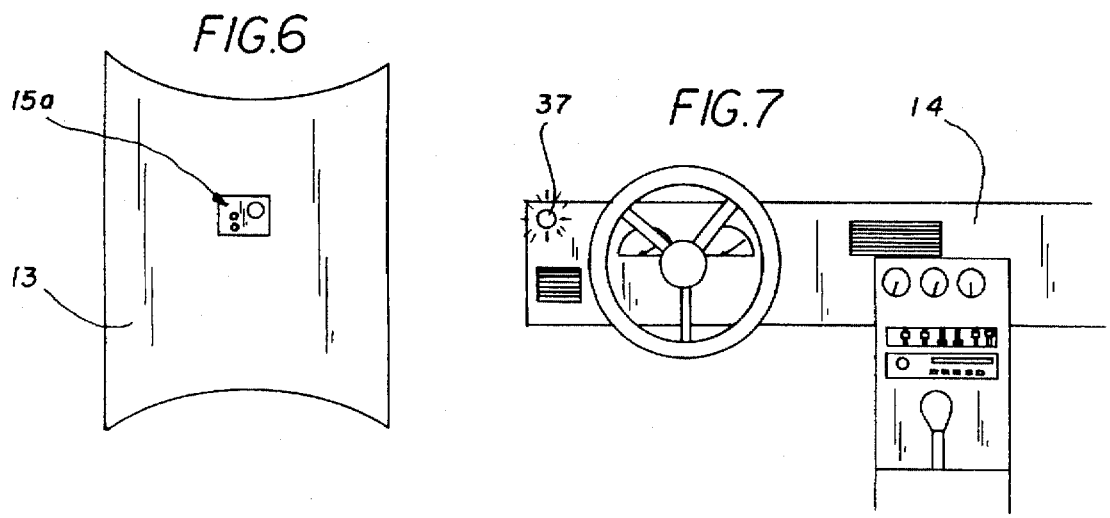

# 5,739,756

CARBON MONOXIDE DETECTION SYSTEM FOR MOTOR VEHICLES

BACKGROUND OF THE INVENTION

1. Field of the Invention

The present invention relates to carbon monoxide detectors and more particularly pertains to a new carbon monoxide detector for motor vehicles for detecting dangerous levels of carbon monoxide within the passenger areas of motor vehicles.

2. Description of the Prior Art

The use of carbon monoxide detectors is known in the prior art. More specifically, carbon monoxide detectors heretofore devised and utilized are known to consist basically of familiar, expected and obvious structural configurations, notwithstanding the myriad of designs encompassed by the crowded prior art which have been developed for the fulfillment of countless objectives and requirements.

Known prior art carbon monoxide detectors include U.S. Pat. No. 5,252,949; U.S. Pat. No. 5,066,466; Des. U.S. Pat. No. 308,646; U.S. Pat. No. 4,221,206; U.S. Pat. No. 4,152,232 and U.S. Pat. No. 3,957,372.

While these devices fulfill their respective, particular objectives and requirements, the aforementioned patents do not disclose a new carbon monoxide detector for motor vehicles. The inventive device includes a carbon monoxide detector mounted at the highest point within a passenger compartment of the vehicle, a visual indicating signal to visually signal a warning when dangerous levels of carbon monoxide are detected, and an audible signaling device to provide an audible signal when dangerous levels are detected.

In these respects, the carbon monoxide detector for motor vehicles according to the present invention substantially departs from the conventional concepts and designs of the prior art, and in so doing provides an apparatus primarily developed for the purpose of detecting dangerous levels of carbon monoxide within the passenger areas of motor vehicles.

SUMMARY OF THE INVENTION

In view of the foregoing disadvantages inherent in the known types of carbon monoxide detectors now present in the prior art, the present invention provides a new carbon monoxide detector for motor vehicles construction wherein the same can be utilized for detecting dangerous levels of carbon monoxide within the passenger areas of motor vehicles.

The general purpose of the present invention, which will be described subsequently in greater detail, is to provide a new carbon monoxide detector for motor vehicles apparatus and method which has many of the advantages of the carbon monoxide detectors mentioned heretofore and many novel features that result in a new carbon monoxide detector for motor vehicles which is not anticipated, rendered obvious, suggested, or even implied by any of the prior art carbon monoxide detectors, either alone or in any combination thereof.

To attain this, the present invention generally comprises a carbon monoxide detector mounted at the highest point within a passenger compartment of the vehicle, a visual indicating signal to visually signal a warning when dangerous levels of carbon monoxide are detected, and an audible signaling device to provide an audible signal when dangerous levels are detected.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new carbon monoxide detector for motor vehicles apparatus and method which has many of the advantages of the carbon monoxide detectors mentioned heretofore and many novel features that result in a new carbon monoxide detector for motor vehicles which is not anticipated, rendered obvious, suggested, or even implied by any of the prior art carbon monoxide detectors, either alone or in any combination thereof.

It is another object of the present invention to provide a new carbon monoxide detector for motor vehicles which may be easily and efficiently manufactured and marketed.

It is a further object of the present invention to provide a new carbon monoxide detector for motor vehicles which is of a durable and reliable construction.

An even further object of the present invention is to provide a new carbon monoxide detector for motor vehicles which is susceptible of a low cost of manufacture with regard to both materials and labor, and which accordingly is then susceptible of low prices of sale to the consuming public, thereby making such carbon monoxide detector for motor vehicles economically available to the buying public.

Still yet another object of the present invention is to provide a new carbon monoxide detector for motor vehicles which provides in the apparatuses and methods of the prior art some of the advantages thereof, while simultaneously overcoming some of the disadvantages normally associated therewith.

Still another object of the present invention is to provide a new carbon monoxide detector for motor vehicles for detecting dangerous levels of carbon monoxide within the passenger areas of motor vehicles.

Yet another object of the present invention is to provide a new carbon monoxide detector for motor vehicles which includes a carbon monoxide detector mounted at the highest point within a passenger compartment of the vehicle, a visual indicating signal to visually signal a warning when dangerous levels of carbon monoxide are detected, and an audible signaling device to provide an audible signal when dangerous levels are detected.

Still yet another object of the present invention is to provide a new carbon monoxide detector for motor vehicles that provides a measure of safety to the occupants of the vehicle.

Even still another object of the present invention is to provide a new carbon monoxide detector for motor vehicles that provides multiple signals upon detection of dangerous levels, to increase the likelihood that the vehicle occupants receive the warning.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of the rear of the detector, with the back plate removed.

FIG. 6 is a view similar to FIG. 2, but showing the detector mounted within the ceiling of the vehicle.

FIG. 7 shows a view of the vehicle dashboard having an indicating light mounted thereon.

DESCRIPTION OF THE PREFERRED EMBODIMENT

Figure 1:
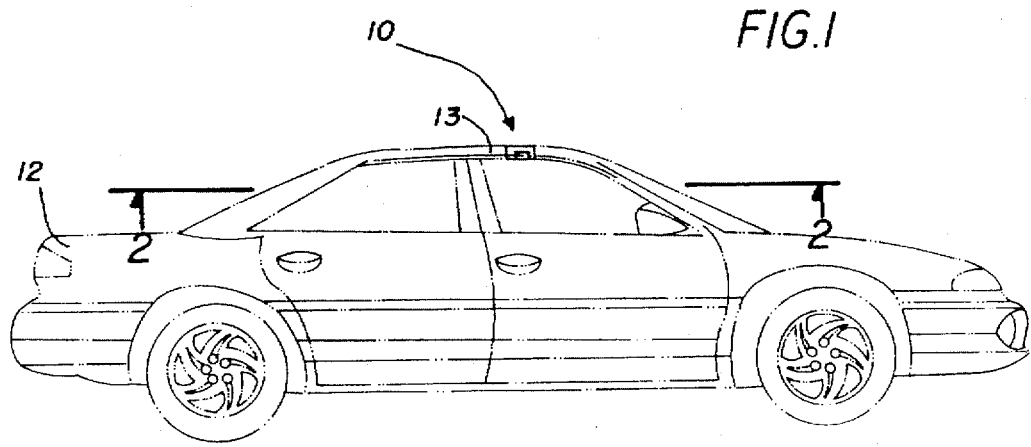
FIG. 1 is a side view of a vehicle having a carbon monoxide detector mounted therein.
Figure 2:
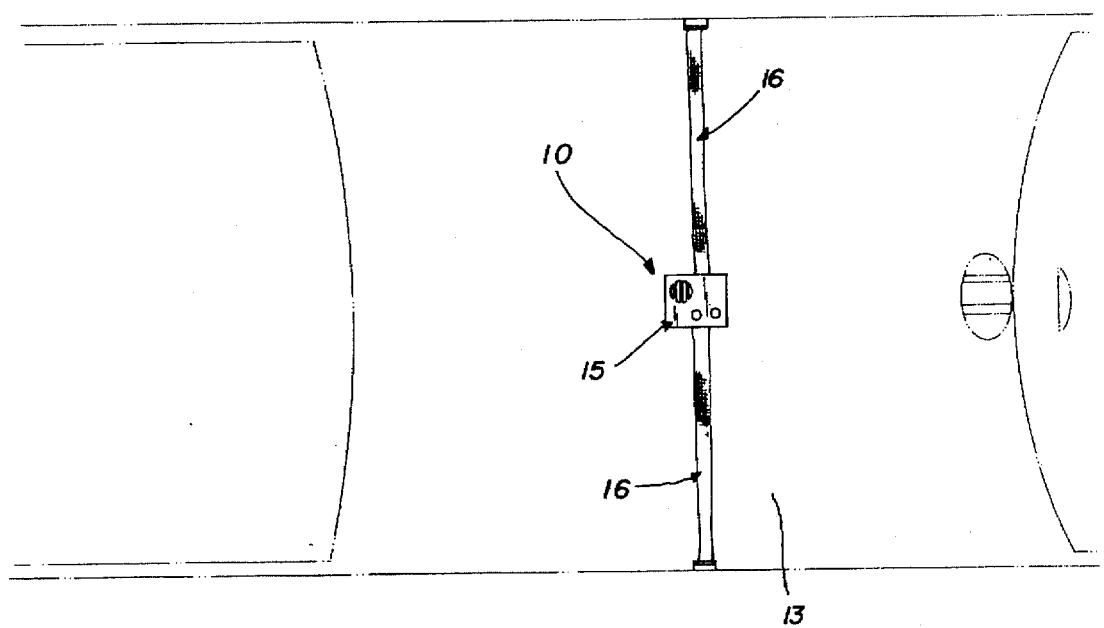
FIG. 2 is a view taken along line 2—2 of FIG. 1.
Figure 3:
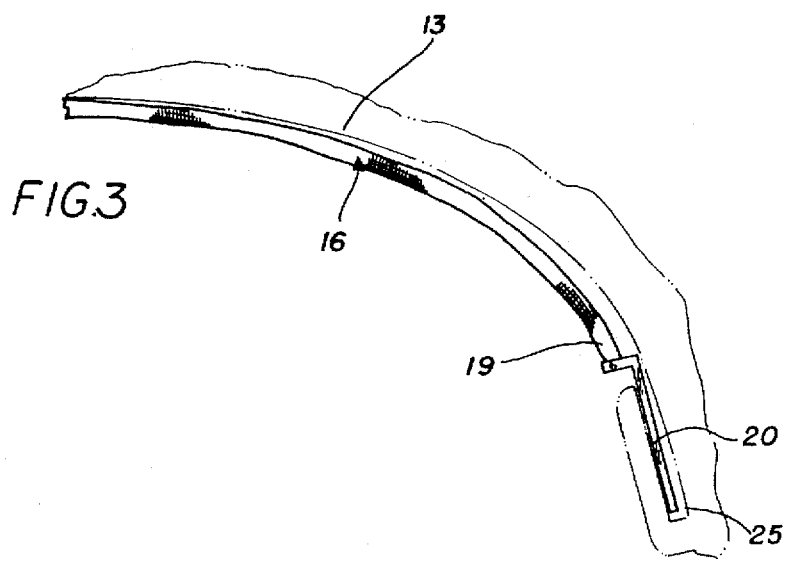
FIG. 3 is an end view of one of the mounting arms to mount the detector inside the vehicle.
Figure 4:
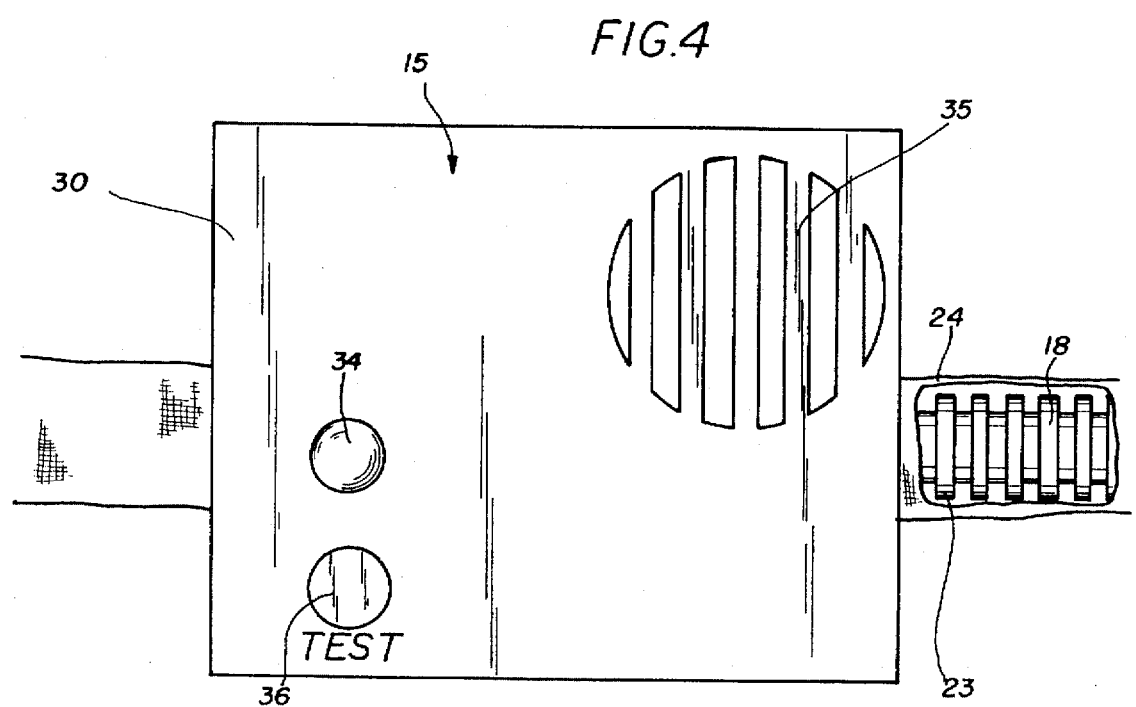
FIG. 4 is an enlarged view of the detector.

With reference now to the drawings, and in particular to FIGS. 1 through 7 thereof, a new carbon monoxide detection system for motor vehicles embodying the principles and concepts of the present invention and generally designated by the reference numeral 10 will be described. The term "motor vehicle" used throughout the description and claims is meant to include cars, trucks, vans, rv's, and the like. This system is also applicable for use on boats having enclosed passenger compartment areas.

More specifically, it will be noted that the carbon monoxide detection system for motor vehicles 10 comprises a conventional carbon monoxide detector 15 mounted at the highest location within a passenger compartment of a motor vehicle 12, such as on a ceiling 13 of the vehicle. The highest location is chosen because the carbon monoxide gas will tend to rise to the top of the interior.

As best illustrated in FIGS. 1 through 5, it can be shown that the detector 15 is mounted adjacent the ceiling in the uppermost region of the vehicle interior by a pair of identical mounting arms 16. Each mounting arm has a first end 17 connected to the detector, an elongated, flexible main body member 18, and a second end 19 which is attached to a mounting foot 20.

As best shown in FIG. 5, the first end 17 of each arm extends through a hole 21 in the side of the detector and extends into a slot 22 formed in the detector 15. The ends 17 are flexible and include a plurality of spaced enlargements which have a size slightly larger than the size of the holes 21. The enlargements 23 permit each end 17 to be adjusted into, or out of, the detector so as to accommodate different vehicle interior sizes and areas. The flexibility of the ends 17 and enlargements 23 permits them to be manually deformed so that they can fit through the holes 21. The ends 17 of each arm are spaced apart from each other within the slot to permit a wide range of adjustment.

The main body members 18 are similar to the ends 17 in that they are flexible and include a plurality of the spaced enlargements 23. As best viewed in FIG. 3, the main body member 18 are curved to follow the inner surface of the ceiling 13. The main body members are encased by a cloth cover 24 which can be decorated so as to match the interior of the vehicle. The ends 17 and the body members 18 can be made of any flexible rubber or plastic material which can be manually deformed to permit bending and flexing of the ends and body members.

The mounting feet 20 are suitably attached to the second ends 19, such as by mechanical fasteners. Each mounting foot 20 is made of a plastic or metallic material, and is elongated such that it fits within a slot 25 formed in ceiling 13 of the vehicle. For instance, the slot 25 can be formed in the molding used to retain the ceiling liner of the vehicle in place. Thus the detector is securely held adjacent the ceiling by the two arms 16, and the arms can be adjusted and deformed to accommodate different vehicle interiors.

The detector 15 includes a rectangular shaped housing 30 which houses any conventional type of carbon monoxide detection means, such as any of the means shown in U.S Pat. Nos. 4,221,206, 5,252,949, or equivalent. The detector 15 is powered by a battery 31 disposed therein. A back plate 32 of the detector 15 is removably attached to the rest of the housing 30 by screws 33 to permit access to the slot 22 and the battery 31.

The top wall of the housing 30 includes an indicating light 34 attached thereto, which flashes when the detector 15 detects a dangerous level of carbon monoxide. The top wall also includes a speaker cover 35 which covers a speaker (not shown) which generates an audible signal when the detector detects the dangerous level of carbon monoxide. Thus dual signals are generated, which increases the likelihood that the vehicle occupant(s) will be notified that a danger exists. The detector 15 also includes a test button 36 which actuates the light 34 and the speaker when pressed in order to test whether the detector 15 is functioning normally. Releasing the button 36 stops the light and speaker. The circuitry for permitting operation of the detector 15 is believed to be obvious to one having ordinary skill in the art and is thus not specifically shown.

FIGS. 6 and 7 illustrate an alternate embodiment where the detector 15a is installed within the ceiling 13 of the vehicle, such that it is flush with the inside of the ceiling, thus eliminating the arms 16. The detector 15a is attached using any appropriate means, such as mechanical fasteners, and such attachment is considered to be permanent, since the detector 15a could not be readily removed. Power for the detector 15a would be supplied by the vehicles power supply, such as the vehicles battery, thus eliminating the battery 31. The electrical connection between the detector 15a and the vehicles power supply would be obvious to one having ordinary skill in the art. This embodiment would also include an indicator light 37 mounted on a dashboard 14 of the vehicle near the driver, such that the light 37 would flash when the dangerous level of carbon monoxide was detected by detector 15a. Therefore the driver of the vehicle would not have to take his eyes from the road to be aware of the flashing warning light 37. The detector 15a is otherwise similar to the detector 15, including speaker, light 34, and test button 36.

In use, either detector 15,15a is mounted within the vehicle in the manner described above. If a dangerous level of carbon monoxide is detected, the visual and audible signals are produced by the detector, giving warning to the occupants that a dangerous condition exists and needs attention. To test whether the signaling devices of the detectors are working properly, the test button 36 is pushed which actuates each signaling device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A system for detecting dangerous levels of carbon monoxide within a passenger compartment of a motor vehicle, comprising:

a carbon monoxide detector mounted by mounting means at the highest point within the passenger compartment;

a visual indicating means associated with the detector to provide a visual signal to an occupant within the passenger compartment upon detection of a dangerous level of carbon monoxide by the detector; and an audible indicating means associated with the detector to provide an audible signal to an occupant within the passenger compartment upon detection of a dangerous level of carbon monoxide by the detector;

wherein the mounting means comprises a pair of mounting arms, one end of each arm being connected to the detector and a second end of each arm being attached to an interior of the vehicle; and wherein the one end of each arm is adjustably connected to the detector such that each arm can be adjusted relative to the detector.

2. The system of claim 1, wherein the detector is mounted within a ceiling of the vehicle and is powered by a power supply of the vehicle.

3. The system of claim 2, wherein the visual indicating means comprises a flashing light mounted on a dashboard of the vehicle, remote from the detector.

4. The system of claim 3, wherein the audible indicating means is attached to the detector.

5. The system of claim 1, wherein each said mounting arm comprises an elongated, flexible member encased by a cloth cover.

6. The system of claim 1, wherein the second end of each arm includes a mounting foot attached thereto which fits within a correspondingly shaped recess in a ceiling of the vehicle.

7. The system of claim 1, further comprising a testing means attached to the detector to test the operation of the visual indicating means and the audible indicating means.

8. The system of claim 1, wherein the visual indicating means comprises a flashing light attached to the detector.

* * * * *